(12) United States Patent
Lindemann et al.

(10) Patent No.: US 11,951,389 B2
(45) Date of Patent: Apr. 9, 2024

(54) SYSTEM AND METHOD FOR USE IN HAPTIC SIGNAL GENERATION

(71) Applicant: Cirrus Logic International Semiconductor Ltd., Edinburgh (GB)

(72) Inventors: Eric Lindemann, Boulder, CO (US); Michael Kurek, Austin, TX (US); Meenakshi Matai, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 17/972,052

(22) Filed: Oct. 24, 2022

(65) Prior Publication Data

US 2023/0063912 A1 Mar. 2, 2023

Related U.S. Application Data

(63) Continuation of application No. 16/776,814, filed on Jan. 30, 2020, now Pat. No. 11,517,815.

(60) Provisional application No. 62/888,720, filed on Aug. 19, 2019.

(51) Int. Cl.
| | |
|---|---|
| A63F 13/285 | (2014.01) |
| A63F 13/215 | (2014.01) |
| A63F 13/23 | (2014.01) |
| G06F 3/01 | (2006.01) |
| G06F 3/16 | (2006.01) |
| G10L 25/21 | (2013.01) |
| H04R 1/02 | (2006.01) |
| H04R 3/04 | (2006.01) |

(52) U.S. Cl.
CPC .......... *A63F 13/285* (2014.09); *A63F 13/215* (2014.09); *A63F 13/23* (2014.09); *G06F 3/016* (2013.01); *G06F 3/165* (2013.01); *G10L 25/21* (2013.01); *H04R 1/025* (2013.01); *H04R 3/04* (2013.01); *A63F 2300/1025* (2013.01); *A63F 2300/1037* (2013.01); *A63F 2300/1081* (2013.01)

(58) Field of Classification Search
CPC ...... A63F 13/285; A63F 13/215; A63F 13/23; A63F 2300/1025; A63F 2300/1037; A63F 2300/1081; A63F 13/424; G06F 3/016; G06F 3/165; G10L 25/21; G10L 21/16; H04R 1/025; H04R 3/04; H04R 2400/03
See application file for complete search history.

(56) References Cited

U.S. PATENT DOCUMENTS

| | | | | |
|---|---|---|---|---|
| 9,425,747 | B2 * | 8/2016 | Bazarjani | .............. H03F 1/0222 |
| 2009/0296959 | A1 * | 12/2009 | Bongiovi | ................. H04R 3/04 |
| | | | | 381/103 |
| 2014/0247120 | A1 * | 9/2014 | Ullrich | .................... G10L 21/06 |
| | | | | 340/407.1 |
| 2019/0215349 | A1 | 7/2019 | Adams et al. | |
| 2019/0379977 | A1 * | 12/2019 | Büttner | ................. G06N 3/088 |
| 2020/0081683 | A1 * | 3/2020 | Cremer | ................. H03G 7/002 |

FOREIGN PATENT DOCUMENTS

| | | | | |
|---|---|---|---|---|
| WO | 2014114781 | A1 | 7/2014 | |
| WO | WO-2014114781 | A1 * | 7/2014 | .......... G10L 19/012 |
| WO | 2020051544 | A1 | 3/2020 | |

\* cited by examiner

*Primary Examiner* — Quan Zhen Wang
*Assistant Examiner* — Mancil Littlejohn, Jr.
(74) *Attorney, Agent, or Firm* — Jackson Walker L.L.P.

(57) ABSTRACT

The application describes techniques for adaptively setting a threshold that will be used to determine the gain applied to a haptics signal.

21 Claims, 12 Drawing Sheets

SYSTEM AND METHOD FOR USE IN HAPTIC SIGNAL GENERATION

The present disclosure is a continuation of U.S. Non-Provisional patent application Ser. No. 16/776,814, filed Jan. 30, 2020, which claims priority to U.S. Provisional Patent Application Ser. No. 62/888,720, filed Aug. 19, 2019, each of which is incorporated by reference herein in its entirety.

FIELD OF THE INVENTION

The present disclosure describes systems and methods for the generation of haptic signals, in particular for the generation of haptic vibrational signals based on received audio.

BACKGROUND

In video-game playing or video watching it is often desirable to generate haptic signals. An amplified haptic signal is sent to a transducer, such as a linear resonant actuator (LRA), mounted inside a device such as a smartphone, tablet, video game controller etc. in order to cause the device to vibrate. These physical vibrations provide feedback to the user to enrich the game playing or viewing experience. Haptic vibrations are typically generated when gunshots, explosions, or other high intensity events occur during a video-game or video.

High intensity events often correspond to loud sounds that are generated by a video or video-game. Haptic signals can be generated directly from a video or video-game which may output a haptic signal track in the same way as it outputs an audio signal track. Alternatively, an Audio-to-Haptics system can be used to automatically generate haptics signals based on audio output—e.g. audio frames—output by the video-game. So, one source of haptic signals is the audio signal itself. The audio signal output from a video-game or video is often a mix of different types of sound, such as music, sound-effects and speech. It is often desired to generate haptic signals corresponding to intense sound effects, e.g. gunshots, explosions, but without generating any haptic signals from an audio signal which comprises music, speech, or less intense sound effects. The present examples are generally concerned with generating haptic effects from an audio signal having certain characteristics or properties, without generating haptic effects from other audio signals having different characteristics or properties.

For a particular video-game or video, or a particular scene from a video-game or video, it is often possible to specify a haptic audio power threshold. An audio signal whose power envelope rises above this threshold may be considered to be a good candidate for generating a haptic event. An audio signal whose power envelope is below this threshold may be more likely to correspond to e.g. speech, music, or less intense sound effects where the generation of a corresponding haptic event is not desired. Thus, the power threshold can be considered to be the power of audio signal at or above which the system is configured to generate a haptic effect.

However, the haptic audio power envelope event threshold may change from one game to another, or from one scene of a game to another scene of that same game. This problem will be explained with reference to FIG. 1.

FIGS. 1a to c show plots of the dB power envelope of lowpass filtered audio output of three example video games. For Video Game 1—shown in FIG. 1a—there are essentially two sounds—first-person gunshots at about −1 dB and distant gunfire reaching a max of −7 dB. There is also some background sound at much lower levels. It is desirable to generate haptics signals for the first-person gunshots but not for the distant gunfire. Setting a threshold halfway between at −4 dB works well for Video Game 1.

For Video Game 2—shown in FIG. 1b—the peaks at around −8 dB beginning at 5 seconds are all candidates for haptics generation. There are also some larger peaks e.g. −5 dB at 50 seconds but it is desirable for all the peaks >=−8 dB to generate haptics.

For Video Game 3—shown in FIG. 1c—the beginning is speech. The first legitimate clash of weapons that should generate a haptics event occurs at −6 dB 43 seconds. The peak at −6 dB 33 seconds is a loud shout which should not generate haptics, but if a haptics event does occur it would be acceptable. The main goal is to avoid generating haptics for the preceding speech segment.

As a result, three different Video Game applications have the following characteristics:

| Video Game | Haptic Event Min. | Non-Haptic Event Max. | Threshold |
| --- | --- | --- | --- |
| 1 (FIG. 1a) | −1 dB | −7 dB | −4 dB |
| 2 (FIG. 1b) | −8 dB | −14 dB | −11 dB |
| 3 (FIG. 1c) | −7 dB | −10 dB | −8.5 dB |

It is desirable to set the threshold for each game or scene of a game so that it is above the non-haptics events maximum and below the haptics events minimum—e.g. half-way between the two as indicated above. As can be seen, there is not a single threshold that works for all of the games. If the threshold is set high enough to avoid the distant gunshots in Video Game 1 at −7 dB, then it will also exclude many of the desired haptic events of Video Game 2 at −8 dB. A need exists for a system that can automatically determine the haptics threshold for a particular game or scene from a game, while the game is being played.

The techniques described herein generally seek to improve on the previously proposed systems and/or seek to mitigate the problems associated with previously proposed systems.

SUMMARY

According to an example of a first aspect there is provided a processing system/module for a haptic signal generation system, the processing system comprising:
 an input for receiving an input signal derived from an audio signal;
 a threshold setting mechanism configured, based on a first representation or feature derived from the input signal, to adaptively adjust an existing threshold to derive a first threshold if a correspondence between the existing threshold and the first representation or feature is not met; and
 a gain determining mechanism configured to determine an output gain to be applied to a haptic signal based on a comparison between the first threshold and a second representation or feature derived from the input signal.

According to at least one example the threshold setting mechanism may be configured to:
 i) adjust the first threshold upwards if the first representation exceeds the first threshold by a predetermined amount;
 ii) adjust the first threshold downwards if the first representation is below the first threshold by a predetermined amount.

According to at least one example the first representation or feature comprises information about the peak power levels of the audio signal. Furthermore, the second representation or feature may comprise information about the power envelope of the audio signal. The information about the power envelope may comprise a smoothed power envelope that rises more quickly when a power level of the input signal rises and falls relatively slowly when the power level of the input signal falls.

According to at least one example the gain determining mechanism is configured to determine a ratio between the first threshold and the second representation. The ratio may be processed such that when the first threshold and the second representation are equal, the output gain is zero. A saturation mechanism may be provided which is configured to saturate the range of the output gain between zero and 1.

According to an example of a second aspect there is provided a haptic signal generation system comprising a processing system according to an example of the first aspect and further comprising:
    an audio signal input for receiving an audio signal; and
    a haptic signal generator for generating a haptic signal, wherein the output gain determined by the gain determining mechanism, or a value derived therefrom, is applied to the haptic signal, and wherein a haptic output signal is generated if the second representation exceeds the first threshold or comes within range of the first threshold.

The haptic system may further comprise a filtering mechanism provided in advance of the processing system and configured to exclude selected frequencies. In one example the filtering mechanism comprises first and second filters each having a different cutoff frequency that is selected to remove first and second components of the audio signal. For example the first filter may comprises a low pass filter and the second filter comprises a high pass filter. According to at least one example, the haptic system may further comprising a second threshold evaluation mechanism which is configured to receive first and second input signals derived from the output of the first and second filters. The second threshold evaluation mechanism may be configured to determine a product of the first and second input signals and to issue a haptic trigger signal if the magnitude of the product is sufficiently high to indicate that both the magnitude of both the first and second input signals is high.

The haptic system may further comprise a re-set mechanism, the re-set mechanism being configured to restore the first threshold to an initial value if a condition of silence is met for a pre-set time period. For example, a condition of silence is met if a metric derived from the at least one input signal to the processing system is the less than or equal to a third threshold. In particular, a condition of silence may be met if a product of the first and second input signals is less than or equal to a third threshold. According to one example the re-set mechanism is configured to advance a counter value if the condition of silence is met, wherein if the counter value exceeds a pre-set time period, the processing system is configured to restore the first threshold to the initial value.

According to an example of a third aspect there is provided a method of generating an output gain to be applied to a haptic signal, the method comprising:
    receiving an input signal derived from an audio signal;
    deriving a first feature from the input signal;
    adjusting an existing threshold to derive a first threshold if a correspondence between the existing threshold and the first feature is not met; and
    comparing the first threshold and a second feature derived from the input signal in order to generate the output gain.

According to one example the method may further comprise applying the output gain, or a value derived therefrom, to a haptic signal; and generating a haptic output signal if the second representation exceeds the first threshold or comes within range of the first threshold.

Associated methods are provided for each of the examples, aspects and embodiments described herewith.

BRIEF DESCRIPTION OF THE DRAWINGS

For a better understanding of the present invention and to show how the same may be carried into effect, reference will now be made, by way of example, to the accompanying drawings, in which.

EXAMPLE EMBODIMENTS OF THE PRESENT DISCLOSURE

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The techniques described herein can be implemented in a wide range of devices and systems.

Figure 1A:
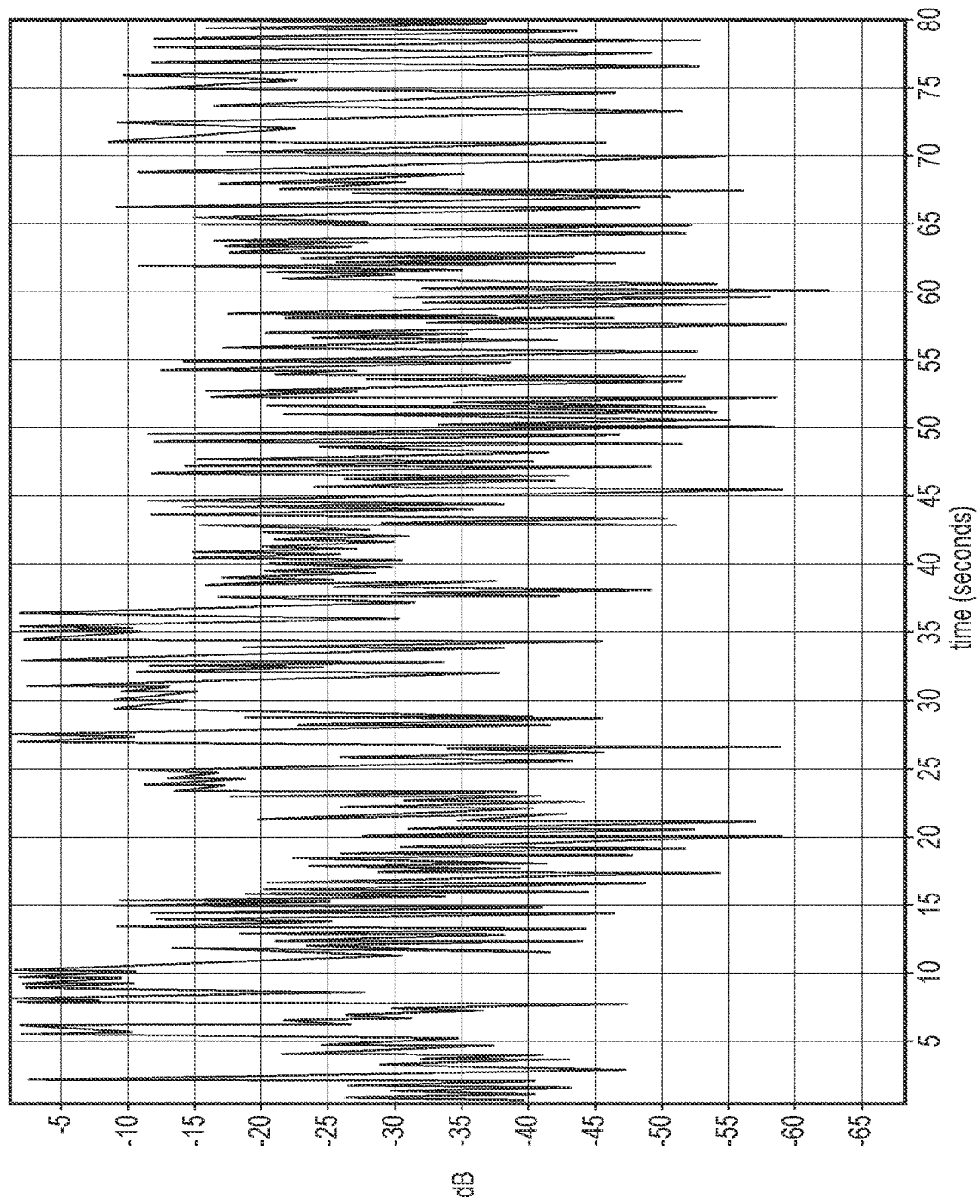
FIGS. 1a, 1b and 1c show plots of the dB power envelope of lowpass filtered audio output of three example video games.
Figure 1B:
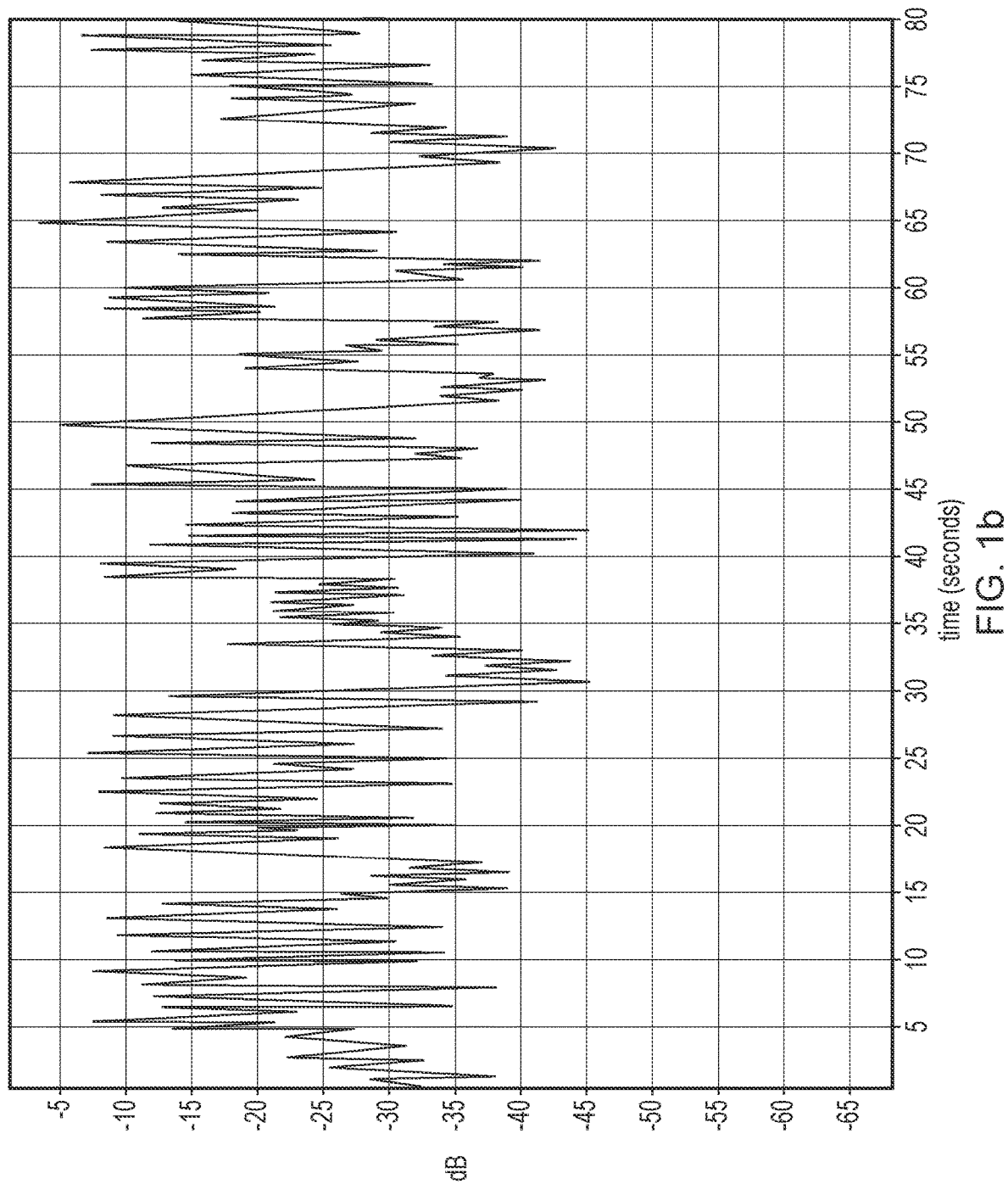
Figure 1C:
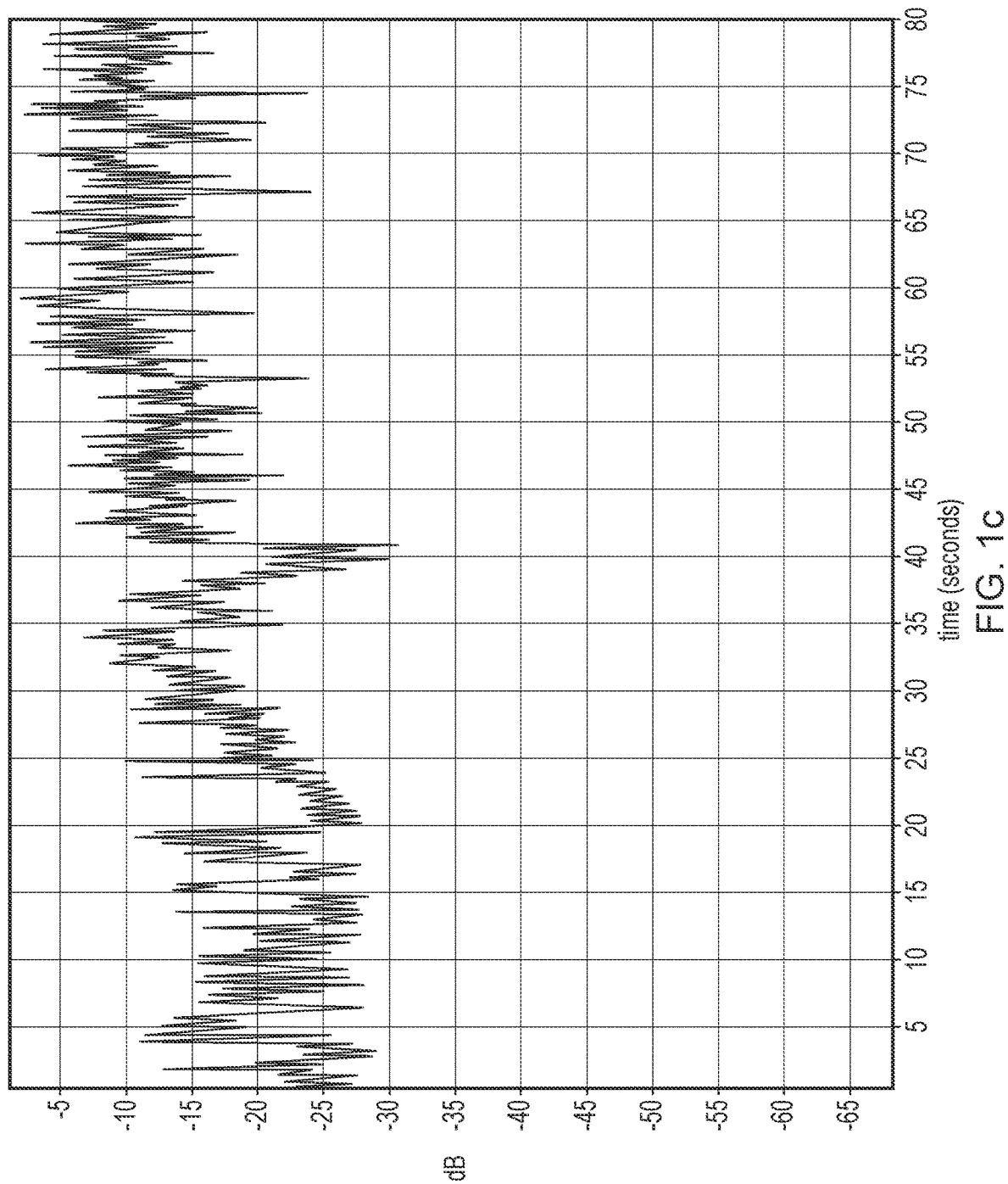
Figure 2:
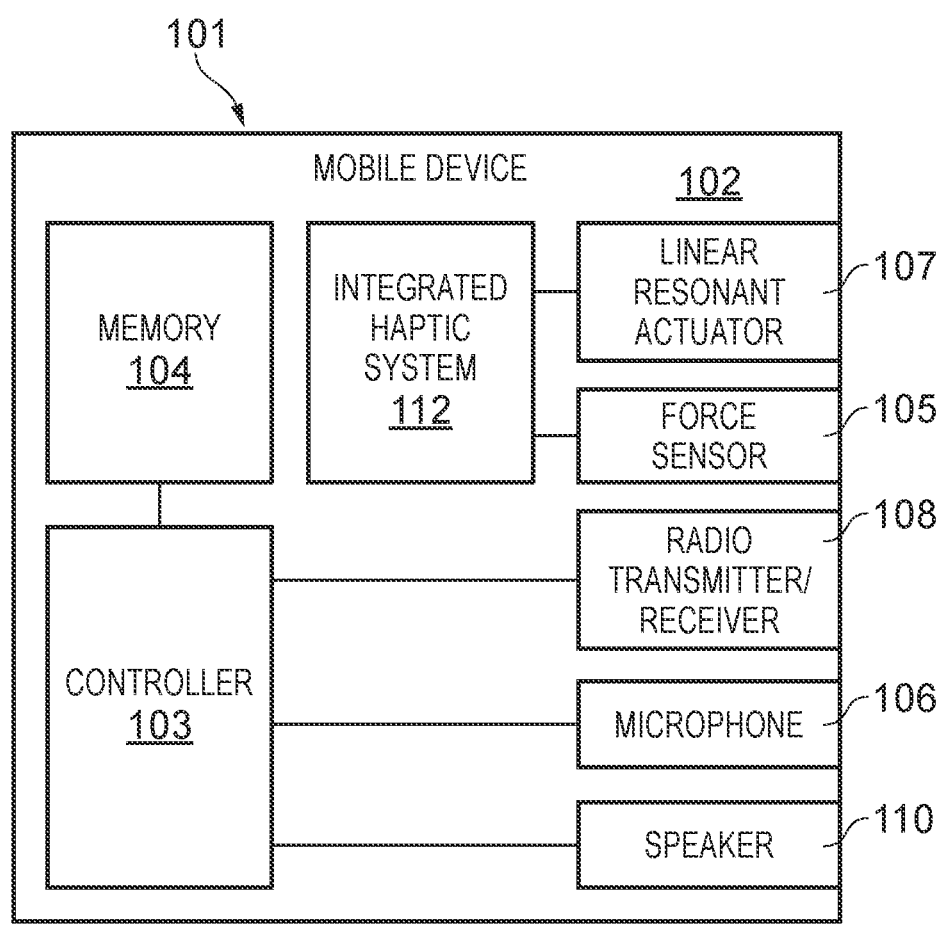
FIG. 2 illustrates a block diagram of selected components of an example mobile device.

FIG. 2 illustrates a block diagram of selected components of an example mobile device 102, in accordance with embodiments of the present disclosure. As shown in the figure, mobile device 102 may comprise an enclosure 101, a controller 103, a memory 104, a force sensor 105, a microphone 106, a linear resonant actuator (LRA) 107, a radio transmitter/receiver 108, a speaker 110, and an integrated haptic system 112. It will be understood that any suitable vibrational actuators arranged to provide a haptic vibration effect (e.g., rotational actuators such as ERMs, vibrating motors, etc.) may be used as an alternative to or in addition to the LRA 107.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102. While FIG. 2 illustrates a mobile device, it will be understood that the illustrated systems may be utilized in other device types, e.g. user-interactable display technology, automotive computing systems, etc.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, 5G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

The force sensor 105 may be housed within, be located on or form part of the enclosure 101, and may be communicatively coupled to the controller 103. Each force sensor of a mobile device 102 may include any suitable system, device, or apparatus for sensing a force, a pressure, or a touch (e.g., an interaction with a human finger) and for generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general-purpose input/output (GPIO) signal associated with an input signal to which haptic feedback is given.

Example force sensors 130 may include or comprise:
capacitive displacement sensors,
inductive force sensors,
strain gauges,
piezoelectric force sensors,
force sensing resistors,
piezoresistive force sensors,
thin film force sensors, and
quantum tunneling composite-based force sensors.

In some arrangements, other types of sensor may be employed. For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce in oscillating mechanical force across multiple axes may be used in lieu of or in addition to linear resonant actuator 107. As described elsewhere in this disclosure, a linear resonant actuator 107, based on a signal received from integrated haptic system 112, may render haptic feedback to a user of mobile device 102 for at least one of mechanical button replacement and capacitive sensor feedback.

Integrated haptic system 112 may be housed within enclosure 101, may be communicatively coupled to force sensor 105 and linear resonant actuator 107, and may include any system, device, or apparatus configured to receive a signal from force sensor 105 indicative of a force applied to mobile device 102 (e.g., a force applied by a human finger to a virtual button of mobile device 102) and generate an electronic signal for driving linear resonant actuator 107 in response to the force applied to mobile device 102.

Although specific example components are depicted above as being integral to mobile device 102 (e.g., controller 103, memory 104, force sensor 105, microphone 106, radio transmitter/receiver 108, speakers(s) 110), a mobile device 102 in accordance with this disclosure may comprise one or more components not specifically enumerated above. For example, although FIG. 2 depicts certain user interface components, mobile device 102 may include one or more other user interface components in addition to those depicted in the above figure, including but not limited to a keypad, a touch screen, and a display, thus allowing a user to interact with and/or otherwise manipulate mobile device 102 and its associated components.

In addition, it will be understood that the device may be provided with additional input sensor devices or transducers, for example accelerometers, gyroscopes, cameras, or other sensor devices.

Figure 3A:
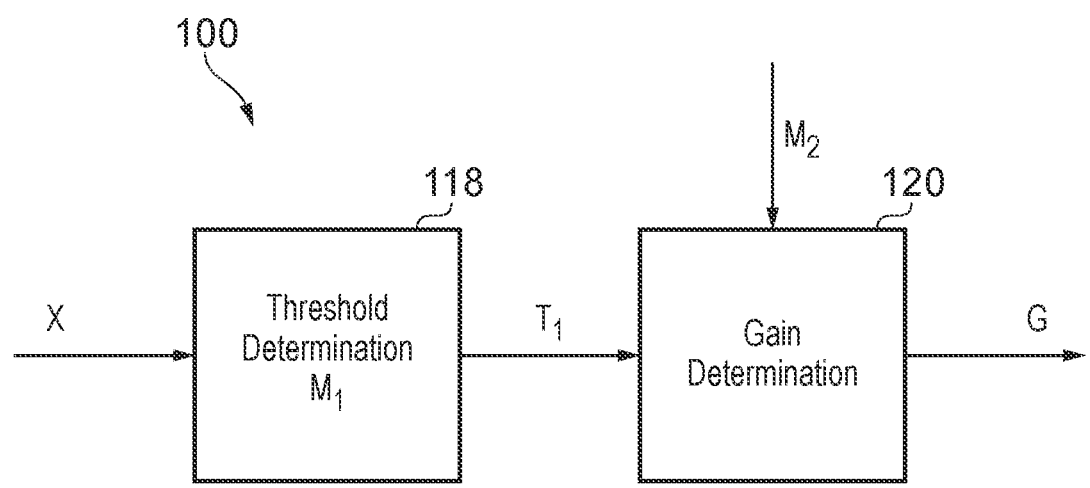
FIG. 3a illustrates a processing system for a haptic signal generation system according to an example of a first embodiment.

FIG. 3a illustrates a first embodiment of a processing system 100 for a haptic signal generation system according to a first present example. The processing system comprises a threshold setting mechanism, which is substantially provided by a threshold determination/estimation portion 118, and a gain determination mechanism, which is substantially provided by a gain determination portion 120.

As illustrated in FIG. 3a the threshold determination unit 118 receives an input signal x which has been derived from an audio signal. It will be appreciated that the audio signal, which may be the audio output of e.g. a game or application, may be subject to one or more prior processing steps (not shown) in order to generate the input signal x. The threshold determination unit 118 is configured to generate a first threshold $T_1$. The first threshold $T_1$ is provided to the gain determination portion 120 which is configured to determine a gain G based on the first threshold $T_1$. The gain G may be applied to a haptic signal based in a subsequent stage (not shown).

The threshold determination unit 118 is configured to extract or derive at least one first feature of the input signal. The first feature may comprise a measure or representation of e.g. wideband power, high frequency power/magnitude and/or low frequency power/magnitude or combinations thereof. Beneficially, the threshold determination unit 118 is configured to adaptively adjust the first threshold based on the first feature which can be considered to be a representation or an estimate of a time-varying property of the input signal x. This advantageously facilitates a system in which the subsequent decision to generate a haptics event is based on the measured characteristics of real-time, or close to real-time, audio output.

The threshold determination or estimation is preferably a continuous process updated at every audio sample. However, audio signal input to the threshold determination unit may be decimated relative to the original audio signal so that it operates at a reduced sample rate. For example, in one particular example the original input audio may be sampled at 48 kHz and then decimated to 8 kHz for input to the threshold determination unit.

The first threshold $T_1$ that is determined by the threshold determination portion 118 is output to gain determination portion 120. The gain determination portion is configured to determine and output a gain G based on the first threshold $T_1$. As illustrated in FIG. 3a, the gain determination portion 120 is configured to determine the gain G based on: i) the first threshold $T_1$ and ii) on a second feature $M_2$ also derived from the input signal. According to one example the gain determination portion comprises a comparator portion which compares the first threshold with the second metric, e.g. by computing a ratio of the first threshold to the second metric. The comparison between the first threshold and the second metric may be computed according to any suitable comparison method and the resultant gain may be modified to achieve a final output gain that is suitable for the overall system. In a subsequent stage (not shown) the gain G is beneficially applied to a haptic signal.

The threshold setting mechanism may be configured, based on the at least one first feature derived from the input signal, to adaptively adjust an existing threshold in order to derive the first threshold. For example, the threshold setting mechanism may be configured to adaptively adjust an existing threshold in order to derive the first threshold if a correspondence between the existing threshold and the first feature/representation is not met.

The gain determining mechanism may be configured to determine an output gain to be applied to a haptic signal based on a comparison between the first threshold and the at least one second feature or representation derived from the input signal.

The thresholding of the present examples can be considered to be dynamically determined from the input audio, rather than pre-determined. This allows sounds that are candidates for haptics generation to be identified within a mixed audio signal comprising sounds that are haptics candidates and non-haptics candidates.

According to at least one specific example of the first embodiment, the first feature comprises an estimate of the power or power level of the audio signal. The threshold setting mechanism may be configured to determine an estimate of the peak of the power level of the input signal based on the power envelope. In this case, according to one example, the threshold setting mechanism is configured to:
  i) adjust the first threshold upwards if the first feature exceeds the first threshold by a predetermined amount;
  ii) adjust the first threshold downwards if the first feature is below the first threshold by a predetermined amount.

According to alternative examples of the first embodiment the first and/or second feature may relate to a property of the audio signal other than power. For example, first and/or second feature may relate to the pitch of the audio signal and/or the spectral shape of the audio signal. It will be appreciated that the characteristics/properties of the audio signal will vary over time. Thus the threshold determination block may be configured to monitor the property of the audio signal continuously or on a frame by frame or feature-by-feature basis.

Figure 3B:
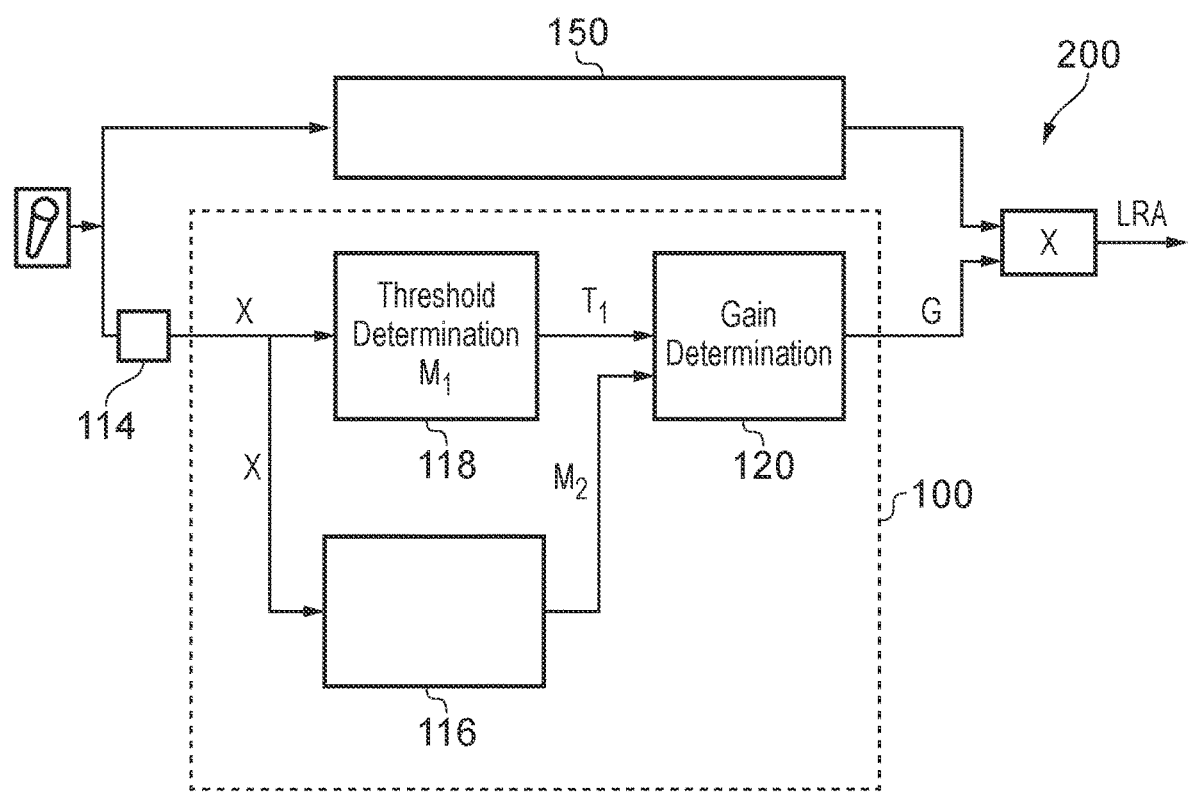
FIG. 3b illustrates an example of a haptic signal generation system according to an example of a second embodiment.

FIG. 3b illustrates an example of a system 200 according to a second embodiment. The system 200 comprises two branches—a gain generation branch and a haptic signal generation branch 150—which are provided in parallel.

The gain generation branch comprises a threshold determination portion 118 and a gain determination portion 120 which form part of a processing system 100 similar to that of the first embodiment. In this example the processing system 100 further comprises a processing portion 116 for deriving the second feature of the input signal that will be used by the gain determination mechanism. The processing portion is provided in parallel with the threshold determination unit 118 and in this implementation is arranged to receive the input signal x. Thus, the input signal x—which is derived from an audio signal—is fed to both the threshold determination unit 118 and the second feature determination portion 116. It will be appreciated that the original audio signal may be processed by one or more processing portions represented by 114 before forming the input signal x for the gain generator. For example, the original audio signal may be filtered to remove e.g. high and/or low frequency components and/or may be squared to generate a representation of the instantaneous power of the signal.

The haptic signal generation branch 150 is configured to receive the original audio signal and to generate a continuous haptic signal H which is fed to multiplier 122. As illustrated in FIG. 3b the gain G determined by the gain determination portion 120, or a value derived from the gain G, is applied to haptic signal H that is derived from the audio signal.

It will be appreciated that one or more processing steps may take place which are not illustrated in FIG. 3a or 3b. For example, an audio signal may be filtered or smoothed before being input to the gain generator 100. In particular, one or more filters may be provided in advance of the gain generator 100 in order to emphasize particular frequencies which are intended to be haptics candidates. Haptics candidates may include, for example, gun shots, bombs and explosions which tend to have a fairly strong low frequency content, as well as sword clinks, etc. which have a high frequency content.

The processing system according to the present embodiments and examples can be considered to use two different representations or metrics, each derived from the input signal. The metrics may be related. The system may also be considered to perform two decision making processes. The first process can be considered to be a threshold setting process which involves deciding whether or not to adjust the threshold based on consideration of an extracted feature or property of the input signal in order to arrive at a first threshold. The second process involves comparing the first threshold with another extracted feature or property of the audio signal in order to generate a positive gain in circumstances where the first threshold is exceeded by specified amount or comes within a specified range of the threshold.

FIGS. 4 to 10 describe a detailed implementation of a system for generating a haptics signal according to a third embodiment. According to this particular embodiment, the threshold setting mechanism employs an adaptive thresholding scheme which is based on a power level of an audio signal.

Figure 4:
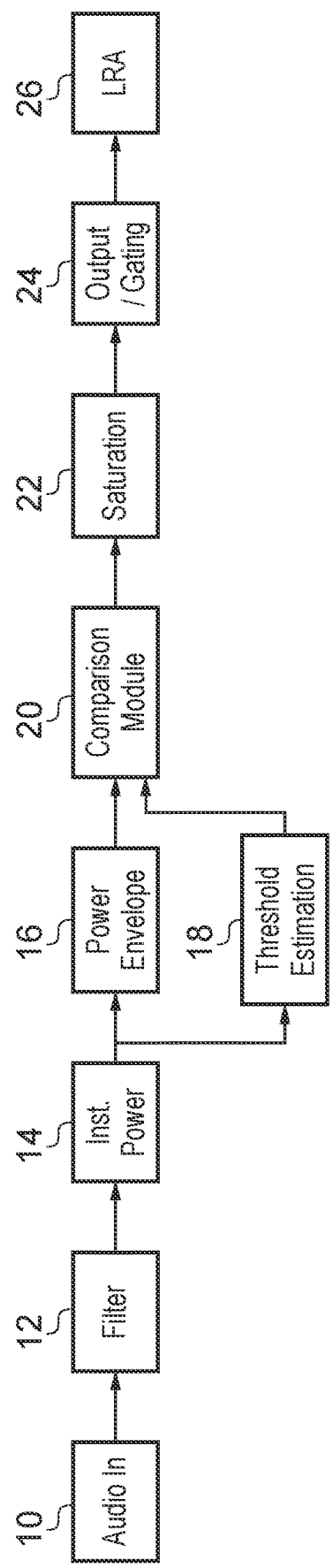
FIG. 4 illustrates an example implementation of a system for generating a haptics signal according to a third embodiment.

FIG. 4 illustrates an example implementation of a system for generating a haptics signal from the audio output of a video-game or video that employs a time-varying adaptive haptic threshold. It will be understood that the above system may be implemented as part of the dedicated haptic system 112 or as part of a central controller such as an Applications Processor or CPU. The system may form part of a device having an audio output transducer and a haptic output transducer. The device may be a mobile telephone, tablet or laptop computer, smart watch, virtual reality (VR) or augmented reality (AR) device, for example.

The system is arranged to receive an audio signal as an input 10 for the generation of a haptic vibrational output signal. The audio signal may be provided as an output from an application, or from a controller or applications processor, for example corresponding to the audio output of a game or other type of application or as the audio output of a video file. The audio signal may be a single channel, or may be provided as a single-channel version of a multi-channel audio signal, e.g. as a sum of the audio levels of stereo channels provided by a summing module.

Figure 5:
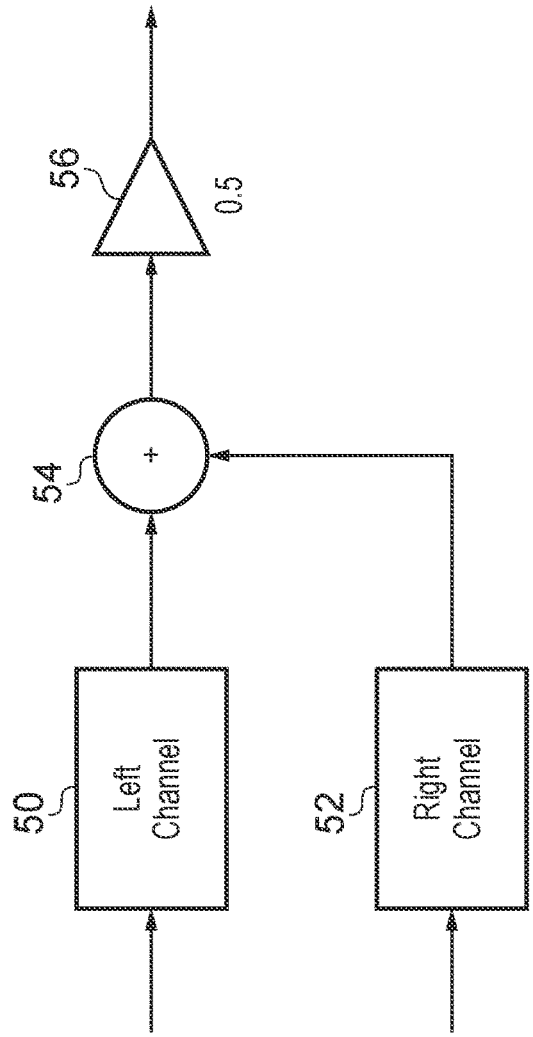
FIG. 5 illustrates an example of a configuration of a summing module for use with the implementation of FIG. 4.

An example of a configuration of a summing module for use with the implementation of FIG. 4 is shown in below FIG. 5.

The example module receives both audio signals for the left channel 50 and the right channel 52, and adds them together using an adder 54. A gain of 0.5 is then applied at 56 to provide the audio signal of module 10 of FIG. 4. Summing the stereo signals raises the relative importance (power) of signals panned to the middle. Most sounds that are candidates for haptic generation are panned to the middle, so this summing operation can provide an effective identifier of haptic signals from the audio.

Returning to FIG. 4, the audio signal is filtered using filter module 12. The filter module may comprise a low-pass filter, having a cut-off frequency of approximately 750 Hz. In an alternative implementation, the filter module may comprise a band-pass filter, having a frequency pass band of approximately 20-750 Hz. The use of a filtering module can help to remove high-frequency components which may be more commonly associated with speech or other audio sources for which it may be undesirable to produce haptic effects.

The output of the filter module 12 is squared using the instantaneous power module 14, to determine the instantaneous power of the signal. The intention is to generate a power envelope—i.e. a signal that tracks peak values of the instantaneous power without tracking the ups and downs of individual audio frequency oscillatory periods. This is accomplished through use of a power envelope module 16 which receives the instantaneous power.

The power envelope module 16 may comprise an asymmetric one-pole unity gain smoothing (lowpass) filter that uses an attack filter coefficient when the input signal (instantaneous power) is rising—i.e. is larger than the current one-pole filter state—and uses a release coefficient when the input signal is falling—i.e. is smaller than the current one-pole filter state. The power envelope module 16 supports separately tuned attack and release times common to most compressors, limiters, and expanders. Typically, the attack time is short (<5 milliseconds) and the release time is longer (>30 milliseconds). The output of the power envelope module 16 is a smoothed power envelope that rises quickly when the input power rises but falls more slowly when the input power falls.

In some cases it may be desirable to refer to the magnitude envelope of the audio signal and the magnitude threshold rather than the power envelope and power threshold. The magnitude envelope is the square root of the power envelope. For the purposes of this disclosure the power envelope and magnitude envelope serve essentially the same purpose.

In the following, we will continue to refer to the power, but it is to be understood that the magnitude envelope can also be used in these cases.

Figure 6:
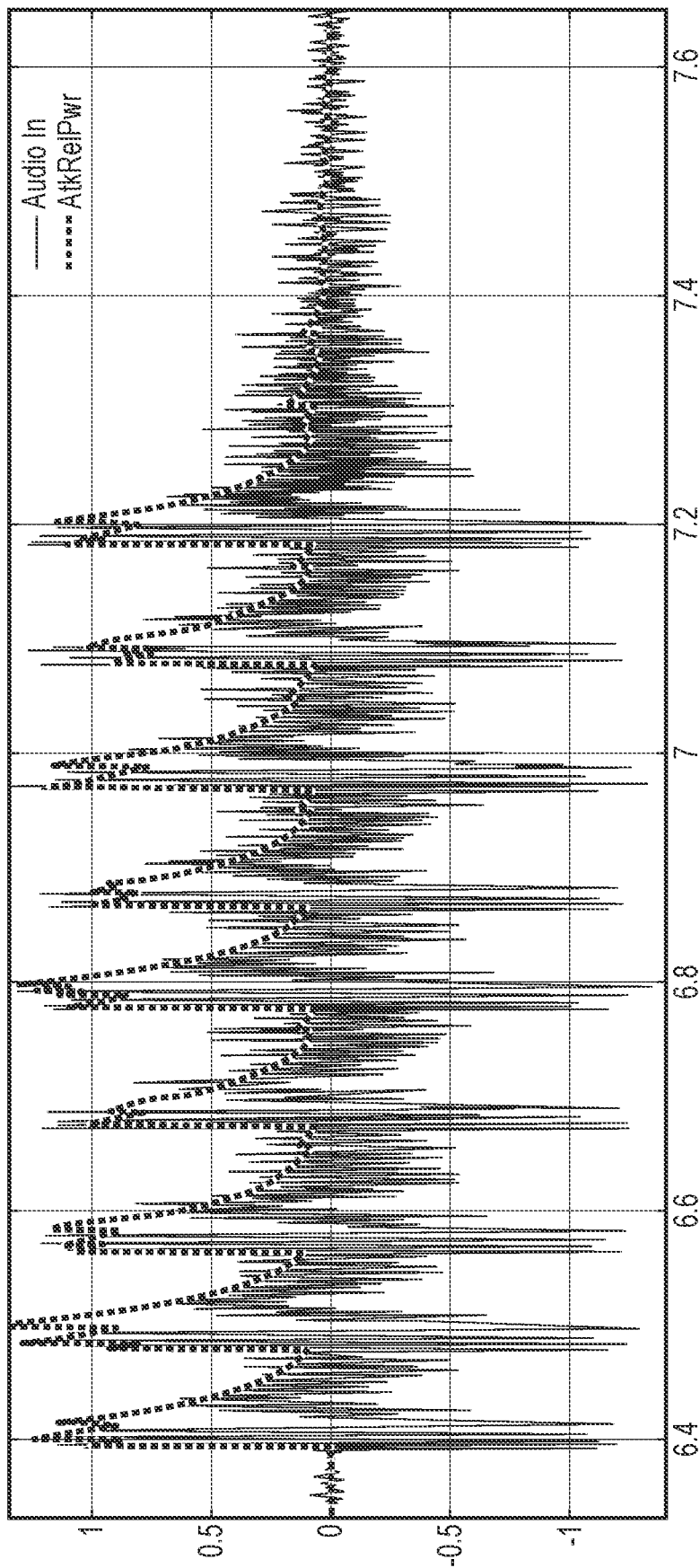
FIG. 6 shows the input audio and the output of an example power envelope module.

FIG. 6 shows the input audio (solid) and the output (dotted) of an example power envelope module 16. The audio sequence corresponds to a sequence of machine gun firings from Video Game 1. The dotted trace now resembles a power envelope. It rises quickly at the start of each gunshot but falls more slowly on release. The example power envelope coefficients used are attack coefficient (atk_coef)=0.9 and release coefficient (rel_coef)=0.999. This is for a 44.1 kHz audio sampling rate.

Figure 7:
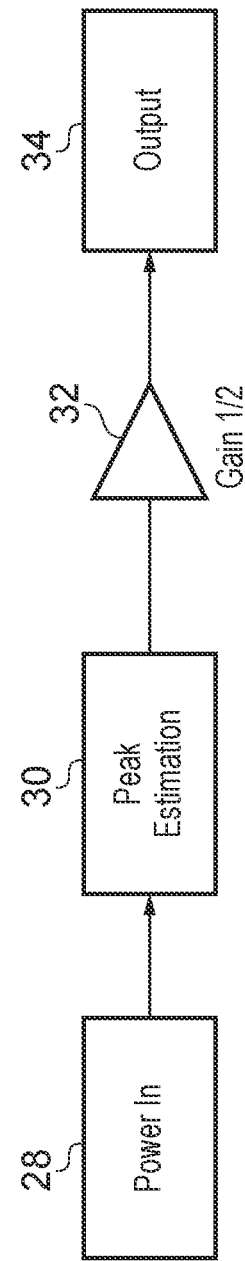
FIG. 7 illustrates an example implementation of a threshold estimation module.
Figure 8:
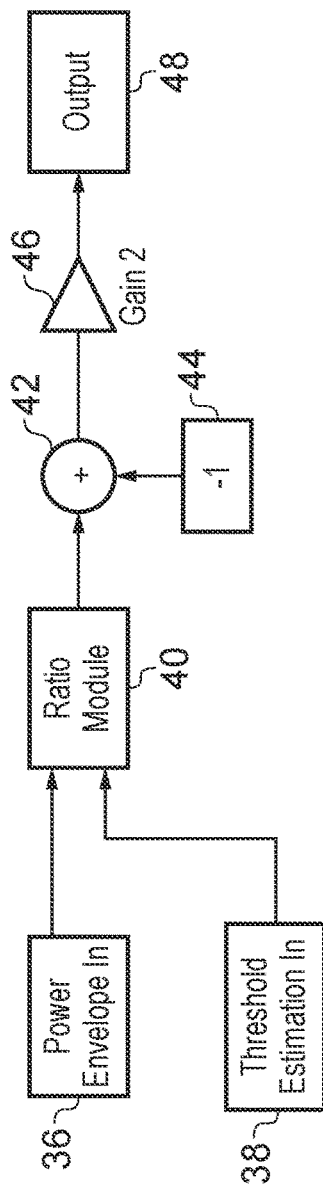
FIG. 8 shows an example implementation of a comparison module.

The audio input power is also passed to a threshold estimation module 18, the contents of an example implementation of which are illustrated in FIG. 7.

The power level input is received at 28, and passed to a peak estimation module 28, which outputs a time-varying peak estimate of the audio power envelope. A gain of 0.5 (or −3 dB) is applied at 32 to this peak estimate to generate the final haptics threshold, which is output at 34.

The output of the power envelope module 16 and the output of the threshold estimation module 18 are then passed to a comparison module 20 which is configured to determine if audio requiring a haptic event has occurred in the input audio. An example implementation of such a comparison module 20 is provided in FIG. 8.

The power envelope is received at 36, and the haptics threshold output of the threshold estimation is received at 38, which are both passed to a ratio module 40 which is configured to calculate the ratio between the input values.

The power envelope module 16, the threshold estimation module 18 and the comparison module 20 can be considered to define a processing system for a haptic signal generation system according to the present examples.

When the power envelope is equal to the haptics threshold the output of the ratio module 40 ratio is 1, and as the power envelope exceeds the threshold this can go considerably higher (usually max around 2). Using an adder 42 and a module 44 programmed with a value of −1, a 1 is subtracted from the output of the ratio module 40 so that when the ratio is 1 the gain (=ratio−1) is 0. The gain rises as the ratio rises above 0. An arbitrary gain may be applied to the output of the adder 42 using amplifier 46, before the final gain is output at 48 as the output of the comparison module 20.

It will be understood that alternative configurations of the comparison module 20 may be used to provide a comparison output, e.g. using suitable threshold comparison methods.

Figure 9:
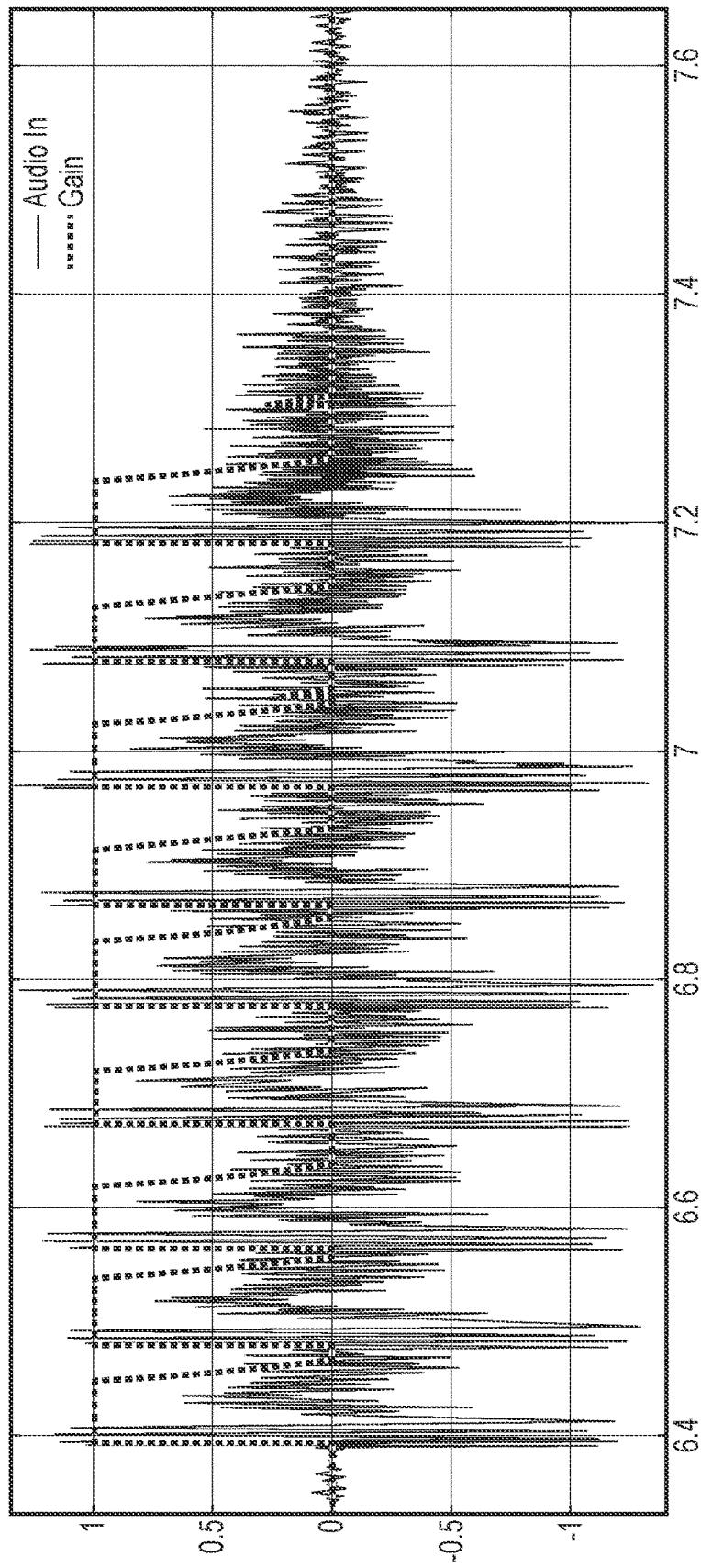
FIG. 9 shows the final gain corresponding to a machine gun audio input of Video Game 1.

Returning to FIG. 4, the final gain can be saturated in a suitable range using the saturation module 22, e.g. in the range 0 to 1. FIG. 9 shows an example of the final gain (dashed) corresponding to a machine gun audio input (solid) of Video Game 1.

The output of the saturation module 22 is provided to an output/gating module 24. The output/gating module 24 is configured to generate a haptic output signal to be provided as an input to a linear resonant actuator 26 or other haptic output transducer to generate the haptic vibration.

In one implementation, the output/gating module 24 may be configured to generate the haptic output signal, e.g. through use of stored haptic waveforms. Alternatively, the output/gating module 24 may be used to gate or trigger the output of a haptic output signal from a separate subsystem, e.g. a system configured to generate a haptic output signal based on an audio input signal.

Figure 10:
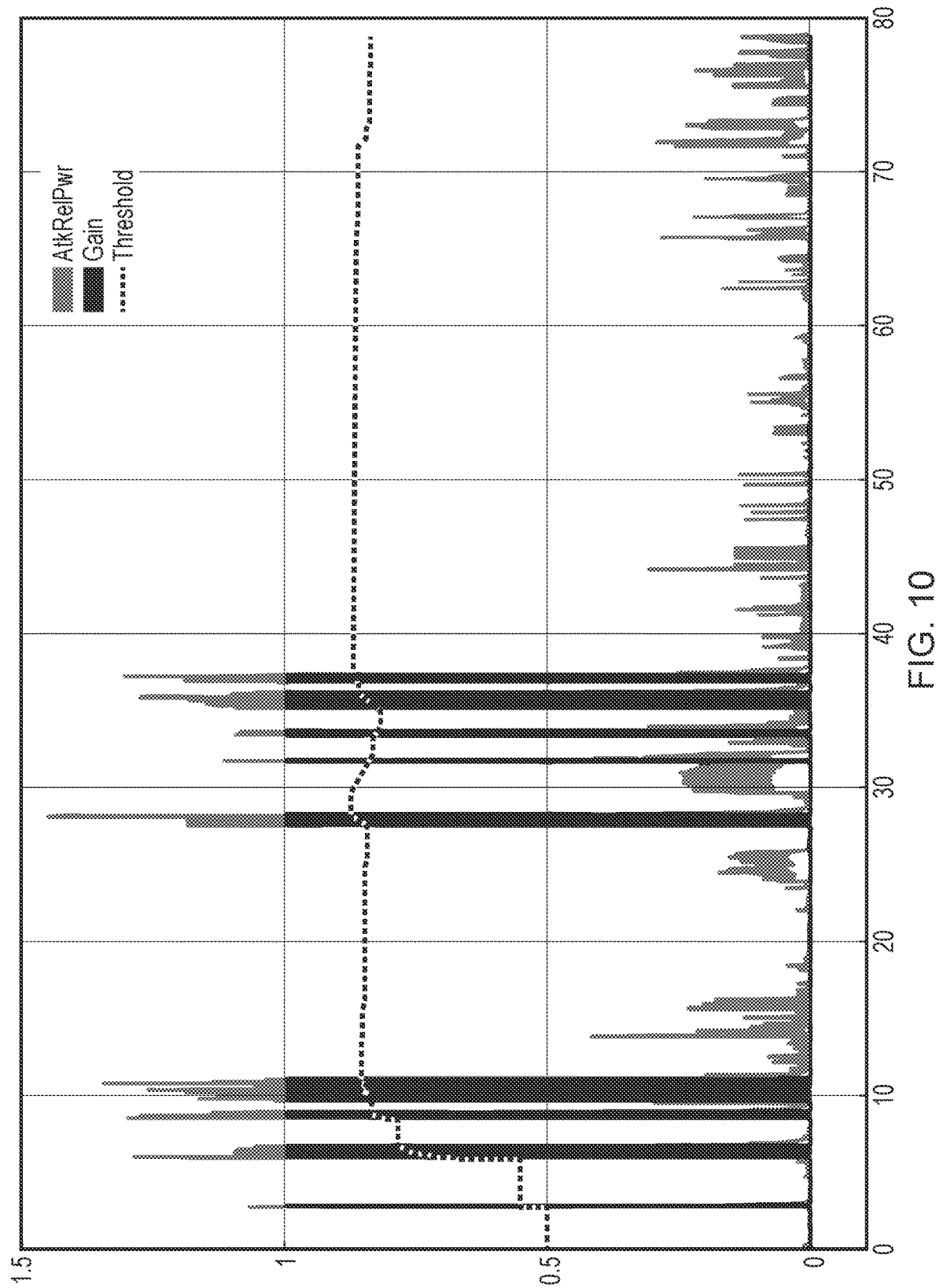
FIG. 10 shows the output of the peak estimation module 28 for a segment of Video Game 1.

Returning to the system of FIG. 7, the peak estimation module 28 is similar to the power envelope module 16 except that it has two different release coefficients—rel-coef_slow, relcoef_fast. The peak estimate value output from the peak estimation module 28 is initially set to a value=0.5 (initial_peak_estimate). This is the a-priori conservative (i.e. relatively high) guess of the peak value. If evidence is received, in the form of a measured power value, that the overall peak level for the game is greater than the current estimate then the current estimate is adjusted upward. FIG. 10 shows the output of the peak estimation module 28 for a segment of Video Game 1.

The dashed line in FIG. 10 represents the output of the threshold estimation module 18 before a gain of 0.5 is applied and with the initial threshold set at an initial a-priori guess of 0.5. The peak/threshold estimate (dashed) starts at the initial guess 0.5, and as loud gunshots (dotted) occur beginning at approximately 6 seconds, the gain (solid) goes to 1, and the peak estimate is driven upwards. Later in FIG. 10, at approximately 13 seconds, a distant gunshot occurs but it is now comfortably below the upwardly adjusted peak estimate so that the gain remains at zero. Note that if the peak estimate had not been driven higher, then the distant gunshot at 13 seconds would have been greater than (0.5*initial_peak_estimate)=0.25, and so would have incorrectly generated a haptic event.

Figure 11:
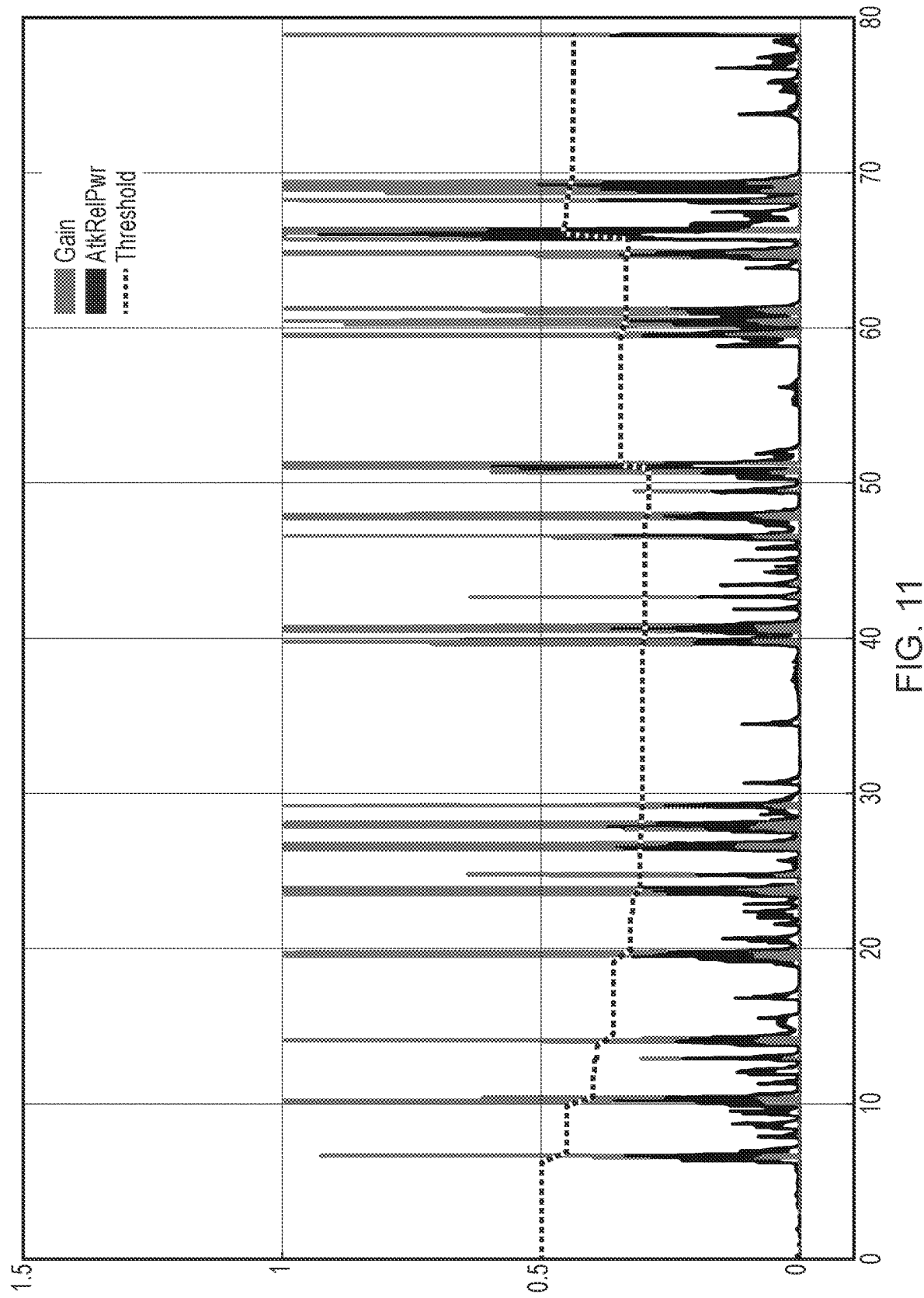
FIG. 11 shows the output of the peak estimation module 30 for a segment of Video Game 2.

If evidence is received, in the form of a measured power value, that the overall peak level for the game is less than our current estimate, then the current estimate is adjusted downward. FIG. 11 shows the output of the peak estimation module 30 for a segment of Video Game 2. In FIG. 11 the peak/threshold estimate (dashed) starts at the initial guess 0.5. In this case the peak estimate is adjusted downward from the initial_peak_estimate=0.5. Adjustments to peak estimate only occur as a result of power levels >=min_in=0.1=−10 dB. Any inputs below −10 dB have no effect on the peak level estimate.

In Video Game 2 the first haptic generating peak occurs at 7 seconds of FIG. 11. This is close enough (within −3 dB) to the initial estimate of peak level that a gain of ~0.9 is generated as seen in FIG. 11 (hashed). A flag called "peak_set" (not shown) is set to 1 whenever the peak estimate is adjusted upward. But at 10 seconds of FIG. 11 this has never occurred for Video Game 2 so the initial value of peak_set=0. If an input with power (solid) greater than min_in=0.1 (−10 dB) but less than the current peak estimate is received while peak_set==0, then the peak estimate is driven downward toward the input power value. For peak_set==0, the peak estimate is changed using the faster of the two release coefficients, relcoef_fast, resulting in a relatively fast change of the peak estimate, as there is no evidence so far that the input will ever rise above the original peak estimate. To the contrary, evidence has just been received, in the form of a lower input power level, that the global peak for the game may be nearer this lower input value. The peak estimate (dashed) is driven repeatedly lower until approximately 20 seconds in FIG. 11. Driving the peak estimate lower in response to lower input power measurements, assures that the peaks in the waveform of FIG. 11 occurring at 7 seconds, 11 seconds, and beyond do cause haptic events to occur with a haptic gain of 1 (dotted).

At 52 seconds in FIG. 11, the input power peaks begin to exceed the current estimate and the peak estimate is again driven upward. The first time it is driven upward—i.e. at 52 seconds—peak_set is set to 1. This indicates that actual input power levels at this higher level have been received and so the existence of these peaks in the game is not in doubt. When that occurs, the system should be more reluctant about driving the peak estimate lower. So, at ~60 seconds peak estimate is again driven lower, but this time more slowly because relcoef_slow is used in the peak estimation module 30 since peak_set=1.

Accordingly, the system provides a time-varying adaptive haptics threshold which is generated by making an initial a-priori conservative guess about the threshold, and then adjusting the threshold upward or downward according to the evidence received, in the form of measured power values. The result is a system that works well with many games, and automatically adapts its haptics event threshold to each game. The use of the above-described system results in accurate audio-to-haptics performance between different applications, as the system adaptively adjusts to the different audio profiles produced by the applications to determine appropriate haptic event thresholds.

As previously discussed, the audio signal may be filtered in advance of the adaptive thresholding mechanism in order to remove frequency components which may be more commonly associated with speech or music for which it may be undesirable to produce haptic effects.

Figure 12:
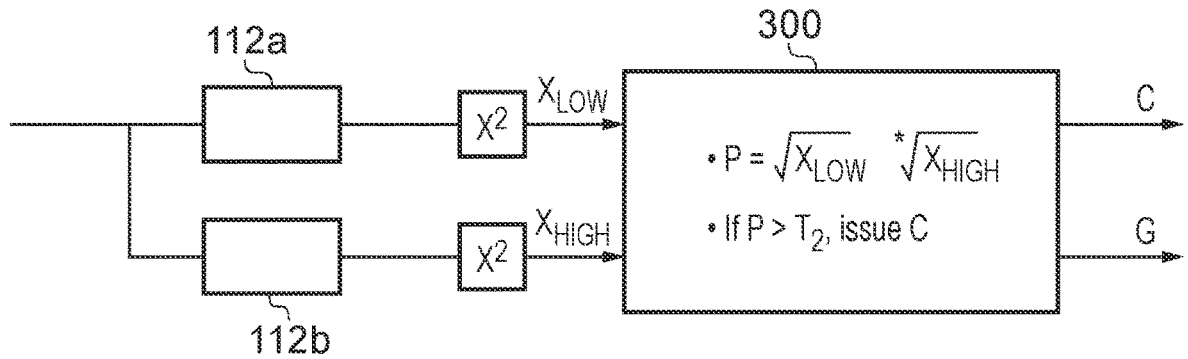
FIG. 12 illustrates an implementation of a filter module comprising first and second filters.

According to a further embodiment, and as illustrated in FIG. 12, a filter module 112 comprises first and second filters each filter having a different cutoff frequency that is selected to remove components of the audio signal that are likely to be generated by a specific sound for which a haptic effect is not desired. Thus, a first filter 112a of the filter module may comprise a low pass filter which may be set at a cutoff frequency that will exclude e.g. bass instruments. In this case, the first filter 12a may be set to around 200 Hz. A second filter 12b of the filter module may comprise a high pass filter which may be set at a cutoff frequency that will exclude e.g. speech. In this case, the high pass filter may be set to around 4 kHz. The highpass signal and lowpass signal form first and second input signals to a processing system 300 according to an example of a processing system according to the present aspects.

Optionally, both filter outputs are decimated by a given factor in order to define a decimated sampling frequency of the system. For example, the filter outputs may be decimated by a factor of 6 so, a 48 kHz input becomes 48/6=8 kHz decimated sampling frequency. Since the highpass signal is above 4 kHz its energy will alias to baseband when the decimation occurs.

Optionally, the highpass signal is multiplied by a gain in order to bring the highpass band up to about the level of the lowpass band. The decimated highpass and lowpass signals are squared to find the instantaneous power of each of the filtered signals, and are then passed through separate low power envelope and high power envelope filters. The outputs of these filters are separate power envelopes of the lowpass and highpass signals. These are input $x_{LOW}$ and $x_{HIGH}$ to the processing system 300.

The processing system 300 is configured to receive the highpass and lowpass power envelopes $x_{LOW}$ and $x_{HIGH}$, and to process the signals in order to evaluate the issuance of a haptic control signal C. Specifically, according to this example, a haptic trigger C is only output if a second threshold $T_2$ is exceeded. Thus, the processing system 300 is configured to carry out a second threshold evaluation process. The second threshold evaluation takes place separately, in addition to, or in place of the first thresholding process already described which results in the issuance of an output gain G. Thus, the processing module 300 optionally incorporates a processing system according to an example of any one of the first to third embodiments.

The second threshold evaluation mechanism utilizes a feature or representation which comprises a product P of the first and second input signals, namely of the lowpass power envelope and the highpass power envelope, in order to evaluate whether to issue a haptic trigger C to e.g. a control module (not shown) and, thus, enable the generation of a haptic output signal or not. According to at least one example the representation used by the second threshold evaluation mechanisms is a product P of the square root of the power of each of the first and second input signals.

In particular, the second threshold evaluation mechanism is defined such that if P is greater than $T_2$, then a haptic trigger C is issued. According to a preferred example, $T_2$ is set such that the product of the first and second input signals must be sufficiently high that both input signals must each have been large/high in order for a haptic trigger to be issued. Thus, the evaluation mechanism in this example can be considered to function like a logical AND gate. In order for the threshold to be exceeded and, thus, a haptics trigger signal to be issued to a control module, both the magnitude of the highpass input signal and the magnitude of the lowpass input signal must be large.

This has a number of advantages in the context of a haptics generations system which receives a mixed audio signal and where sounds like speech and music are not intended to generate a haptic effect. It will be appreciated that sound effects that are potential haptics candidate, e.g. gunshots, explosions, car crashes—exhibit a frequency spectrum that is fairly wideband so that they have both high and low frequency power. Speech has high frequency power >4 kHz but it generally does not have much low frequency power <200 Hz. So, in the case of speech, the product derived from first and second input signals will be low because the magnitude of the lowpass filtered input signal will be low and, according to the present example, no haptic trigger signal will be output. In the case of music, bass instruments may have considerable low frequency power but not much high frequency power, so the lowpass filtered signal will be high but the highpass filter signal will be low, so the product will not be sufficiently high to initiate a haptic trigger.

The present embodiments and examples are generally concerned with performing a number of measurements on the audio signal, or on signals derived therefrom, in order to adaptively set, or adjust, a first threshold for determining a gain that will be applied to a haptics signal. Thus, the setting of the first threshold ultimately determines the occurrence of a haptics output signal to e.g. an LRA. Advantageously, the adaptive or iterative adjustment of the first threshold allows previous characteristics of the audio signal to be accounted for in the setting of the threshold. For example, it will be appreciated that as the level of background sound effects such as distant gunfire or other sounds such as speech or music rise, evaluating the issuance of a haptic event based on a pre-set power level threshold becomes less effective. Thus, the present examples advantageously facilitate haptics candidates to be more accurately identified based on the measured characteristics of the received audio signal.

It will be appreciated that a need arises to reset the original starting conditions of the haptics signal generation system in circumstances, such as between scenes of a game, after a period of no game-play or when changing games. This may be beneficially achieved by a re-set mechanism. According to one or more examples the haptics signal generation system is provided with a re-set mechanism which restores or resets the first threshold, and optionally one or more other system settings, following a period of "silence". Silence is defined as being a condition where a measured parameter of the audio signal or a signal/representation derived therefrom is less than, or less than or equal to, a third threshold $T_3$.

Figure 13:
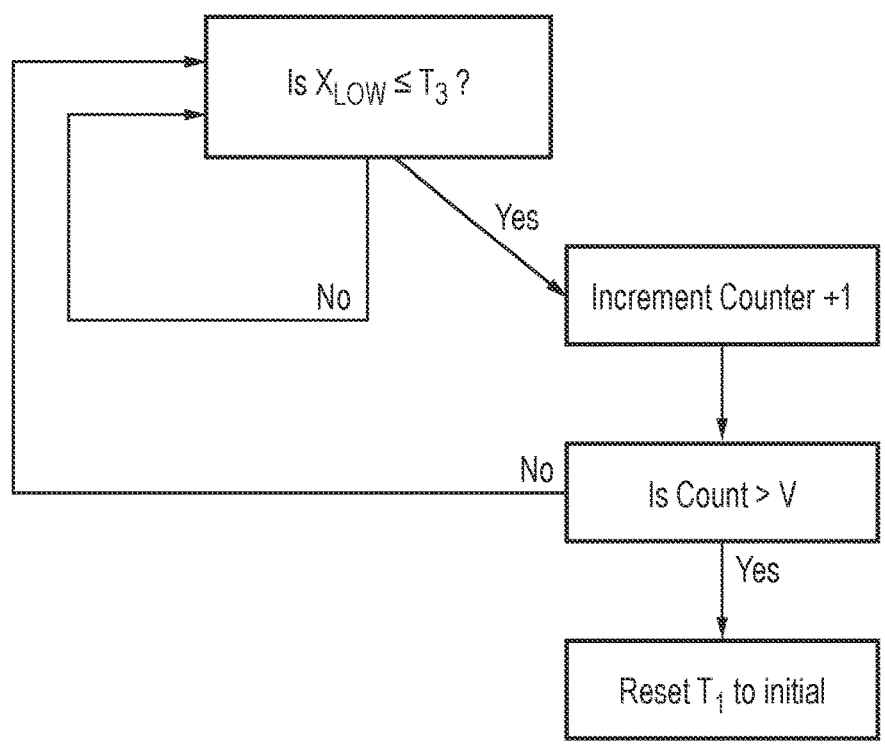
FIG. 13 illustrates a process of checking if a condition of silence is met.

According to a further example a haptic system is provided which further comprises a re-set mechanism configured to carry out a process of checking whether a condition of silence has been met. This may be achieved, according to one specific implementation which utilizes the same input signals as the implementation described with reference to FIG. 12, by a process of checking if the lowpass input $x_{LOW}$ is less than, or less than or equal to, a third threshold $T_3$. The third threshold may be a tuning parameter. Such a process is illustrated by FIG. 13. Specifically, if $x_{LOW}$ is less than $T_3$ then a counter is incremented. Otherwise the counter is reset to zero. If the silent counter exceeds a pre-set value V, e.g. 0.75 seconds, the system is reset to its initial conditions. Typically, if a user switches from one game to another there will be a period of silence in between. This silence also often occurs when a game changes from one scene to another. So, if the algorithm remains running while a user switches games, or the game changes scenes, the initial conditions will be reset.

In a further aspect, it will be understood that the thresholds may be adjusted based on power supply levels in the system. For example, for a mobile device, when a battery is at a full or nearly-full level, the system may maximize the haptic effects generated from an audio signal, e.g. by increasing the gain amounts, or by lowering initial haptics thresholds. However, if the battery level is low or the device is in a battery conservation mode, the system may reduce or eliminate entirely the generation of haptic effects from audio, e.g. by reducing the gains applied to the signals, increasing the initial thresholds, or by disabling the haptic system entirely.

It will be understood that the above-described methods may be implemented in a dedicated control module, for example a processing module or DSP as shown in the above figures. The control module may be provided as an integral part of the sensor system or may be provided as part of a centralized controller such as a central processing unit (CPU) or applications processor (AP). It will be understood that the control module may be provided with a suitable memory storage module for storing measured and calculated data for use in the described processes.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone. It will be understood that embodiments may be implemented as part of any suitable human-machine interface system, for example on a home appliance or in a vehicle or interactive display. There is further provided a host device incorporating the above-described system.

There is further provided a control method for a sensor system as described above.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

Aspects of the system may be defined by the following numbered statements:

1. A method of generating a haptic output signal comprising the steps of:

receiving an audio signal;

estimating a power level of the audio signal; and generating a haptic output signal based on the power level, if the power level exceeds or comes within a range of a first threshold, wherein the method further comprises the step of adaptively adjusting the first threshold based on at least one of the following:

the power level; and/or historic threshold changes.

2. Preferably, the method comprises the step of filtering the audio signal prior to the step of estimating a power level, preferably low-pass filtering the audio signal, preferably low-pass filtering with a high-frequency cut-off of approximately 750 Hz.

3. Preferably, the step of estimating a power level comprises generating a power envelope of the audio signal, preferably a smoothed power envelope configured with a relatively short attack time constant and a relatively long release time constant.

4. Preferably, the step of adaptively adjusting the first threshold comprises performing a peak estimation to track peak power levels of the audio signal, wherein the first threshold is revised upwards if a peak power level estimate exceeds or comes within a range of a peak threshold, and wherein the first threshold is revised downwards if a peak power level estimate is below or differs by greater than a range of the peak threshold.

5. Preferably, the step of adjusting the first threshold comprises multiplying the peak estimate by a gain to produce an estimate of the first threshold, preferably where the gain is 0.5 or −3 db.

6. Preferably, the step of adjusting the first threshold is responsive to the power level exceeding a base threshold different to the first threshold. The power level must exceed the base threshold to have any effect on the adaptively changing threshold.

7. Preferably, the base threshold is lower than the first threshold, further preferably the base threshold is approximately −10 dB from full scale.

8. Preferably, the method comprises the step of initially setting the first threshold at a level of 0.5 of full scale.

9. Preferably, the step of receiving an audio signal comprises:
   receiving a stereo or multi-channel audio signal, and
   summing the separate channels of the stereo or multi-channel audio signal to raise the relative importance of audio signals panned to a middle channel.

Different Time Constants/Release Coefficients

10. Preferably, the rate of adjustment of the first threshold is partly controlled based on at least one release time constant or release coefficient, wherein the method comprises the step of selecting a release time constant or release coefficient from a plurality of release time constants or release coefficients.

11. Preferably, the step of selecting a release time constant or release coefficient is based at least in part on the power level and/or historic threshold changes.

12. Preferably, the step of selecting a release time constant or release coefficient is based on the peak power level.

13. Preferably, the method selects a release coefficient between:
   a relatively fast first release coefficient, and
   a relatively slow second release coefficient,
   wherein if the peak power level of the received audio has not exceeded the first threshold, the relatively fast first release coefficient is selected for the adjustment step, and
   wherein if the peak power level of the received audio has exceeded the first threshold, the relatively slow second release coefficient is selected for the adjustment step.

Accordingly, if the peak power levels have not exceeded the threshold, the system is relatively quick to adjust the threshold downward towards an optimum level for the application in question through use of the fast release coefficient. If the peak power levels have reached the threshold, the system is relatively slow to adjust the threshold downward, using the slow release coefficient.

14. A method of generating a haptic output signal comprising the steps of:
   receiving an audio signal;
   estimating a power level of the audio signal; and
   generating a haptic vibrational output based on the power level, if the power level exceeds a haptic trigger threshold,
   wherein the method further comprises the step of adaptively adjusting the haptic trigger threshold based on at least one of the following:
   the power level; and/or
   historic threshold changes.

15. Preferably, the method comprises the step of adjusting the haptic trigger threshold if the power level exceeds a base threshold.

16. Preferably, the method comprises the step of outputting the haptic output signal as an input for a haptic transducer such as a linear resonant actuator.

17. Alternatively, the method comprises the step of gating or triggering the output of a haptic output signal.

18. Preferably, the method comprises—before the outputting step—the step of saturating or clipping the mixed signal to a range suitable for input to a haptic transducer.

19. In a further aspect, it will be understood that the step of adjusting may be varied based on available power supply, e.g. a battery level for a mobile device.

For example, in situations where the device has a reduced power supply or low battery level, accordingly the thresholds may be controlled to reduce the level of the haptic output signal, or even to prevent the generation of a haptic output.

20. There is further provided a system arranged to implement the steps of the above-described methods.

21. There is provided a system for the generation of a haptic output signal, the system comprising a controller arranged to implement the following steps:
   receive an audio signal;
   estimate a power level of the audio signal; and
   generate a haptic output signal based on the power level, if the power level exceeds or comes within a range of a threshold,
   wherein the controller is configured to adaptively adjust the threshold based on at least one of the following:
   the power level; and/or
   historic threshold changes.

22. There is provided a host device comprising a system as described above and a haptic transducer such as a linear resonant actuator, wherein the controller outputs the haptic output signal to the haptic transducer to generate a haptic vibrational output.

The invention claimed is:

1. A processing system for a haptic signal generation system, the processing system comprising:
   an input for receiving an input signal derived from an audio signal;
   a threshold setting mechanism configured, based on a first representation derived from the input signal, to adaptively adjust an existing threshold to derive a first threshold if a correspondence between the existing threshold and the first representation is not met, wherein the first representation comprises a time-varying of peak levels of a time-varying property of the input signal and wherein the existing threshold and first threshold are threshold values of that property, and wherein the threshold setting mechanism is configured to adjust the first threshold upwards if the first representation exceeds the first threshold by a predetermined amount and adjust the first threshold downwards if the first representation is below the first threshold by a predetermined amount; and
   a gain determining mechanism configured to determine an output gain to be applied to a haptic signal based on a comparison between the first threshold and a second representation derived from the input signal, wherein the second representation comprises an envelope of the time-varying property of the input signal;
   wherein said envelope of the time-varying property of the input signal tracks peak values of the time-varying property of the input signal, and wherein the time-varying property is a power level or magnitude or pitch or spectral shape of the input signal.

2. A processing system as claimed in claim 1 wherein the first representation comprises a representation of peak power levels of the audio signal.

3. A processing system as claimed in claim 1, wherein the second representation comprises a power envelope of the audio signal.

4. A processing system as claimed in claim 3 wherein the power envelope comprises a smoothed power envelope that rises more quickly when a power level of the input signal rises and falls relatively slowly when the power level of the input signal falls.

5. A processing system as claimed in claim 1, wherein the gain determining mechanism is configured to determine a ratio between the first threshold and the second representation.

6. A processing system as claimed in claim 5, wherein the ratio is processed such that when the first threshold and the second representation are equal, the output gain is substantially zero.

7. A processing system as claimed in claim 1, further comprising a saturation mechanism configured to saturate the range of the output gain between zero and 1.

8. A haptic signal generation system comprising a processing system as claimed in claim 1, further comprising:
an audio signal input for receiving an audio signal; and
a haptic signal generator for generating a haptic signal,
wherein the output gain determined by the gain determining mechanism, or a value derived therefrom, is applied to the haptic signal, and wherein a haptic output signal is generated if the second representation exceeds the first threshold or comes within range of the first threshold.

9. A haptic signal generation system as claimed in claim 8, the system further comprising a filtering mechanism provided in advance of the processing system and configured to exclude selected frequencies.

10. A haptic signal generation system as claimed in claim 9, wherein the filtering mechanism comprises first and second filters each having a different cutoff frequency that is selected to remove first and second components of the audio signal.

11. A haptic signal generation system as claimed in claim 10, wherein the first filter comprises a low pass filter and the second filter comprises a high pass filter.

12. A haptic signal generation system as claimed in claim 10, further comprising a second threshold evaluation mechanism which is configured to receive first and second input signals derived from the output of the first and second filters.

13. A haptic signal generation system as claimed in claim 12, wherein the second threshold evaluation mechanism is configured to determine a product of the first and second input signals and to issue a haptic trigger signal if the magnitude of the product is sufficiently high to indicate that both the magnitude of both the first and second input signals is high.

14. A haptic signal generation system as claimed in claim 8, further comprising a re-set mechanism, the re-set mechanism being configured to restore the first threshold to an initial value if a condition of silence is met for a pre-set time period.

15. A haptic signal generation system as claimed in claim 14, wherein a condition of silence is met if a metric derived from the at least one input signal to the processing system is less than or equal to a third threshold.

16. A haptic signal generation system as claimed in claim 15, wherein a condition of silence is met if the first input signal is less than or equal to a third threshold.

17. A haptic signal generation system as claimed in claim 15 wherein the re-set mechanism is configured to advance a counter value if the condition of silence is met, wherein if the counter value exceeds a pre-set time period, the processing system is configured to restore the first threshold to the initial value.

18. A processing system as claimed in claim 1, configured to adjust the first threshold or the output gain based on a power supply level in the haptic signal generation system.

19. A processing system as claimed in claim 18, wherein:
the first threshold is lowered or the output gain is increased when a battery of the haptic signal generation system is full or nearly-full; and/or
the first threshold is increased or the output gain is decreased when the battery of the haptic signal generation system has a low energy storage level or is in a battery conservation mode.

20. A method of generating an output gain to be applied to a haptic signal, the method comprising:
receiving an input signal derived from an audio signal;
deriving a first representation from the input signal;
adjusting an existing threshold to derive a first threshold if a correspondence between the existing threshold and the first representation is not met, wherein the first representation comprises a time-varying representation of peak levels of a time-varying property of the input signal and wherein the existing threshold and first threshold are threshold values of that property, and wherein the threshold setting mechanism is configured to adjust the first threshold upwards if the first representation exceeds the first threshold by a predetermined amount and adjust the first threshold downwards if the first representation is below the first threshold by a predetermined amount; and
comparing the first threshold and a second representation derived from the input signal in order to generate the output gain, wherein the second representation comprises an envelope of the time-varying property of the input signal;
wherein said envelope of the time-varying property of the input signal tracks peak values of the time-varying property of the input signal, and wherein the time-varying property is a power level or magnitude or pitch or spectral shape of the input signal.

21. A method according to claim 20, further comprising:
applying the output gain, or a value derived therefrom, to a haptic signal; and
generating a haptic output signal if the second representation exceeds the first threshold or comes within range of the first threshold.

* * * * *